Oct. 23, 1962

J. T. UNWIN 3,059,999

PRODUCTION OF BARIUM OXIDE

Filed Oct. 6, 1958

INVENTOR
Jack Trask Unwin

BY George H. Carey

ATTORNEY

3,059,999
PRODUCTION OF BARIUM OXIDE
Jack Trask Unwin, Luton, England, assignor to Laporte Chemicals Limited, Luton, England, a British company
Filed Oct. 6, 1958, Ser. No. 765,504
Claims priority, application Great Britain Oct. 29, 1957
8 Claims. (Cl. 23—186)

This invention relates to the production of barium oxide and more particularly to the production of barium oxide by reduction of pelletised barium carbonate in a fluidised bed.

It is well known that barium carbonate may be reduced by carbon in an inert atmosphere to barium oxide at a temperature in excess of approximately 1000° C., carbon monoxide being given off during the reduction process (where a sweep gas is employed this temperature may be reduced to about 800° C.).

It is an object of this invention to provide a new and improved process for the production of barium oxide.

It has now been found according to this invention that when effecting this reduction process in a fluidised bed by using pellets of barium carbonate intimately mixed with carbon, it is desirable to use pellets which contain, or which during the pellet forming step have contained, a salt of lithium, sodium or potassium, particularly a carbonate. Pellets formed in the presence of these salts are hard and well suited to the fluidisation process, the effect of the salt being to contract or densify the pellet. In this way dust looses during the fluidisation are reduced.

Accordingly, the present invention provides a process for the production of barium oxide wherein pellets containing barium carbonate and carbon are formed by calcining a mixture containing barium carbonate, carbon and at least one salt of at least one of the alkali metals, lithium, sodium and potassium in an atmosphere of an inert gas at a temperature of from 400 to 1000° C. and then fluidising the pellets formed in an atmosphere of an inert gas at a temperature of from 800 to 1025° C.

It will be understood that the pellets which are fluidised may or may not contain a salt or salts of one or more of the alkali metals specified, it being sufficient that the said salt or salts is or are present during the pelleting process.

Preferably the salts are the carbonates of the alkali metals specified.

Preferably the fluidising gas velocity is from 1 to 10 times the critical gas velocity of the bed.

Preferably the percentage of carbon in the pellets is at least 5% by weight.

Preferably the percentage of the alkali metal salt in the pellets during the pellet forming step is at least 0.2% by weight.

Preferably the pellet forming step comprises forming an intimate mixture of carbon, barium carbonate, and the alkali metal salt, passing the mixture down an inclined rotating shaft heated to a temperature of from 100 to 400° C., sieving the resulting soft pellets to give pellets of the desired size, and heating the pellets in a rotary calciner at a temperature of from 400 to 1000° C. in an inert atmosphere, preferably nitrogen.

Preferably the salt is removed from the pellets prior to fluidisation by dissolution in water.

It will be noted that the lower limit of the temperature range given above is 800° C. This is because the gases used for fluidising not only fluidise but also act as sweep gases.

The process of fluidisation is well known and the operation of the process of this invention insofar as the reaction in the fluidised bed reactor is concerned is no different in principle from well known and widely operated fluidisation reactions. The velocity of the fluidising gases is conveniently made about 4 times the critical gas velocity whilst a convenient size of pellet is between approximately 14 mesh B.S.S. (0.204 mm.) and 44 mesh B.S.S. (0.353 mm.).

The proportion of carbon to barium carbonate is most preferably about 6:100 since this ensures complete reduction of the barium carbonate without leaving other than trace amounts of unreacted carbon in the resulting barium oxide.

The action of the alkali metal salt is to bind the pellet together and when the rotary pelletisation method as described below is employed a dense, hard, sphere-like pellet results which is well suited to fluidisation as compared with particles formed, for example, by extrusion of carbon-barium carbonate mixtures followed by heating and controlled crushing.

Any gas which does not support combustion of the carbon in the pellets may be used for both fluidisation and calcination. Thus helium or nitrogen or methane may be used.

It should be noted that the reduction in the fluidised bed may be carried out with the salt of lithium, sodium or potassium still in the pellet but in some cases it may be desirable to remove this salt after the pellet forming step since the salt may vaporise in the conditions obtaining in the fluidised bed reactor and solidify in other parts of the system. This may result in the plant having to be shut down so that these undesirable deposits may be removed. This may be eliminated by treating the pellets prior to fluidisation with some liquid which will dissolve out the salt and leave the barium carbonate and carbon untouched. In practice this liquid is usually water.

In carrying out the pellet forming step the most satisfactory temperature to which to heat the inclined rotating shaft is about 300° C. Below 100° C. water is not readily driven off whilst above 400° C. densification of the barium carbonate-carbon mixture occurs. When these higher temperatures are employed it is necessary to dry in an oxygen-free atmosphere to prevent or largely eliminate combustion of the carbon.

The accompanying diagrammatic drawings illustrate a rotary pelletisation apparatus suitable for pellet formation.

Figure 1:
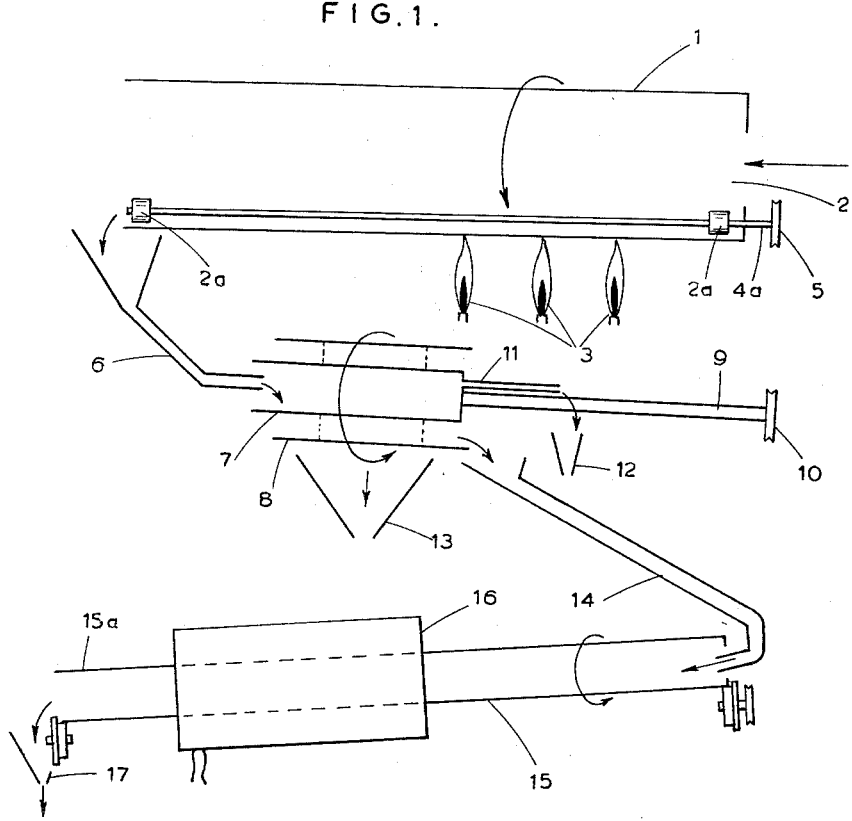
FIG. 1 shows a side elevation of the apparatus.
Figure 2:
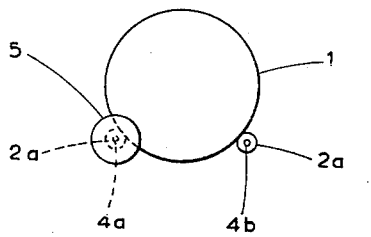
FIG. 2 shows an air view of part of the apparatus.

Referring to the drawings, carbon-barium carbonate mixture containing an alkali metal salt is fed to a rotating stainless steel tube 1 through a hole 2. This tube is heated externally by sources of heat 3 and is supported by two shafts 4a and 4b and four rollers 2a mounted on said shafts. The two rollers on the rotatable shaft 4a are fixed and provide the drive to the tube, a pulley wheel 5 being rotated by a flexible drive (not shown). The rollers on shaft 4b are free-running, shaft 4b being fixed. Only shaft 4a is shown in FIG. 1 for simplicity.

The angle at which the tube 1 is set is best determined empirically when setting up the apparatus to obtain pellets of the desired size. It is believed that the size of the pellet obtained is dependent upon the water content of the mixture fed through the hole 2, and the angle and speed of rotation of the tube 1.

On leaving tube 1 the soft pellets pass down a vibrator 6 and through rotary screens 7 and 8. The screens 7 and 8 are concentrically mounted about the axis of a rotatable shaft 9 which has a pulley wheel 10 mounted upon it. This wheel is driven by a flexible belt (not shown). Over-size pellets pass through a tube 11 and a guide-way 12 and are collected in a vessel (not shown). Under-size pellets pass through both screens 7 and 8 and, having passed through a guide-way 13 are collected in a vessel (not shown). Material rejected for over-size or under-size may be reprocessed.

Pellets of the desired size pass through the screen 7 but not through the screen 8 and are fed via a vibrator 14 to a rotary calciner 15 which is constructed of stainless steel and supported and driven in a similar manner to the tube 1. The calciner 15 is heated by an electric furnace 16.

The pellets pass down the calciner 15, densify and harden therein, and are discharged at the end 15a of the calciner 15. They then pass through guide-way 17 to be collected in a vessel (not shown). In order to prevent combustion of the carbon during heating an inert gas, such as nitrogen, is fed through the discharge end of the tube 15.

In a typical experiment the tube 1 was 61 cms. long, 15.2 cms. in diameter and was rotated at 40 r.p.m. The operational temperature was maintained at 250–300° C. The through-put of the tube was 2.72 kgms. to 4.54 kgms. per hour, the proportion of under-sized pellets obtained being 25%. The residence time of the carbon-barium carbonate mixture in the tube was approximately 10 minutes. The outside screen 8 was 20.3 cms. in length, 10.2 cms. in diameter, and constructed of mesh of size 44 B.S.S. (0.353 mm.). The inside screen 7 was 20.3 cms. in length, 4.9 cms. in diameter and constructed of mesh size 14 B.S.S. (1.204 mms.). The screening system was rotated at a speed of 44 r.p.m. and had a capacity of 2.27 kgms. to 4.54 kgms. per hour. The calciner was 76.2 cms. in length, 4.9 cms. in diameter, and was heated by a 2 kw. electric furnace. The length of the heated zone was 25.4 cms., the temperature being 700° C. The calciner was rotated at 32 r.p.m. and had a through-put of 1.80 to 3.60 kgms. per hour, the residence time of the pellets in the calciner being of the order of 2½ minutes. The slope of the calciner was 1 in 30.

The following examples illustrate the process of the present invention:

Example 1

4.54 kgms. of barium carbonate were mixed with 0.30 kgm. of carbon in 0.45 kgm. lots in a small rotary mixer. The percentage of sodium carbonate in the mixture was 0.9% by weight and that of the moisture in the mixture was 30% by weight. The mixture was then passed through the pelletising apparatus shown in the accompanying drawings. The calcination temperature was 700° C., the packing densities before and after calcination being 1.0 g. per cc. and 1.8 g. per cc. respectively. The sieve analysis was as follows: +18=13%; +30=49%; +60=37%; +85=0.2%; −85=0.4%. Reduction in a fluidised bed resulted in a product containing 95 to 98% of barium oxide.

Example 2

4.54 kgms. of barium carbonate were mixed with 0.31 kgm. of carbon as in Example 1. The percentages of water and sodium carbonate in the mixture were as in Example 1, as was the pelletisation procedure. The packing densities before and after calcination were 1.0 g. per cc. and 1.8 g. per cc. respectively. The sieve analysis was as follows: +18=7%; +30=47%; +60=45%; +85=0.4%; −85=0.4%. The product upon reduction in a fluidised bed contained 93 to 96% of barium oxide.

In the examples B.S.S. sieves were used, the openings having the following sizes:

18 mesh B.S.S.=0.853 mm.
30 mesh B.S.S.=0.500 mm.
60 mesh B.S.S.=0.251 mm.
85 mesh B.S.S.=0.178 mm.

What I claim is:

1. In the process for producing barium oxide by fluidising preformed pellets of barium carbonate and carbon in an inert gas at a temperature from 800 to 1025° C., the improvement comprising preforming said pellets including said barium carbonate, said carbon and at least 0.2% of the combined weight of said barium carbonate and said carbon, of a carbonate of a metal selected from the group consisting of lithium, sodium and potassium and subsequently calcining said preformed pellets in an inert gas atmosphere at a calcining temperature from 400 to 1000° C. prior to said fluidising, whereby said preformed pellets are dense, hard and spherical.

2. The process of claim 1 wherein said pellets are preformed to a density of at least about 1.8 grams per cubic centimeter.

3. The process of claim 1 wherein the percentage of carbon is at least 5% of said barium carbonate.

4. The process of claim 1 wherein said metal is sodium.

5. The process of claim 4 wherein said sodium carbonate is about 0.9% of the combined weight of said barium carbonate and said carbon.

6. The process of claim 1 wherein said metal carbonate is removed from said pellets prior to said fluidising.

7. The process of claim 6 wherein said metal carbonate is dissolved from said pellets with water.

8. In the process for producing barium oxide by fluidising preformed pellets of barium carbonate and carbon in an inert gas at a temperature from 800 to 1025° C., the improvement comprising preforming said pellets by mixing said barium carbonate and said carbon with a carbonate of a metal selected from the group consisting of lithium, sodium and potassium, passing said mixture down an inclined rotating shaft heated from 100 to 400° C. to form soft pellets, selecting pellets of the desired size from said soft pellets, and heating said selected pellets in a rotary calciner in an inert gas atmosphere at a temperature from 400 to 1000° C. prior to said fluidising.

References Cited in the file of this patent

UNITED STATES PATENTS

| | | |
|---|---|---|
| 1,113,178 | Akers | Oct. 13, 1914 |
| 2,297,300 | Hardesty et al. | Sept. 29, 1942 |
| 2,316,043 | Billings et al. | Apr. 6, 1943 |
| 2,689,973 | Lee et al. | Sept. 28, 1954 |
| 2,772,950 | Rahn et al. | Dec. 4, 1956 |

OTHER REFERENCES

Bakers Analyzed C.P. Chemicals and Acids, January 1, 1935, page 29, Phillipsburg, N.J.